United States Patent
Hu et al.

(10) Patent No.: US 11,640,801 B2
(45) Date of Patent: May 2, 2023

(54) DISPLAY APPARATUS, DISPLAY DRIVE CIRCUIT AND DRIVING METHOD OF ELECTRONIC PAPER DISPLAY UNIT

(71) Applicant: BOE TECHNOLOGY GROUP CO., LTD., Beijing (CN)

(72) Inventors: Kejun Hu, Beijing (CN); Jinlei Li, Beijing (CN); Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 144 days.

(21) Appl. No.: 17/425,044

(22) PCT Filed: Jan. 13, 2021

(86) PCT No.: PCT/CN2021/071447
§ 371 (c)(1),
(2) Date: Jul. 22, 2021

(87) PCT Pub. No.: WO2021/147720
PCT Pub. Date: Jul. 29, 2021

(65) Prior Publication Data
US 2022/0319444 A1    Oct. 6, 2022

(30) Foreign Application Priority Data
Jan. 23, 2020    (CN) .......................... 202010076282.9

(51) Int. Cl.
*G09G 3/34* (2006.01)
(52) U.S. Cl.
CPC ......... *G09G 3/344* (2013.01); *G09G 2310/00* (2013.01); *G09G 2330/026* (2013.01); *G09G 2330/027* (2013.01); *G09G 2370/16* (2013.01)
(58) Field of Classification Search
None
See application file for complete search history.

(56) References Cited

U.S. PATENT DOCUMENTS 9,292,782 B2 *   3/2016   Savoj ............... G06K 19/07749
10,068,513 B2    9/2018   Liu et al.
(Continued)

FOREIGN PATENT DOCUMENTS

| AU | 2016298778 A1 | 3/2018 |
| CA | 2993483 A1 | 2/2017 |

(Continued)

OTHER PUBLICATIONS

Waveshare Electronics, 4.2 inch NFC Powered e Paper, https://www.youtube.com/watch?v=Hq8WsdunwJ0, Dec. 12, 2019. (Year: 2019).*

(Continued)

*Primary Examiner* — Matthew Yeung
(74) *Attorney, Agent, or Firm* — Calfee, Halter & Griswold LLP

(57) ABSTRACT

The present disclosure relates to a display apparatus, a display drive circuit and a driving method of an electronic paper display unit, which relates to the field of display technology. The display drive circuit includes a display control circuit, the display control circuit includes a capacitor unit, a radio frequency circuit, a voltage collection circuit, and a control circuit. The radio frequency circuit includes an induction circuit and a communication circuit. The induction circuit can charge the capacitor unit in response to a radio frequency signal of the terminal device. The collection circuit can collect the voltage of the capacitor unit. The control circuit can perform the transmission action when the voltage of the capacitor unit reaches an operating threshold voltage of the electronic paper display unit; turn off the voltage collection circuit and the communication circuit after the transmission action is completed.

20 Claims, 4 Drawing Sheets

(56) References Cited

U.S. PATENT DOCUMENTS

| | | |
|---|---|---|
| 10,085,139 B2 | 9/2018 | Kovacs et al. |
| 10,223,850 B2* | 3/2019 | Sample ............ G06K 19/07762 |
| 10,740,575 B1* | 8/2020 | Kim .................. G06K 7/10237 |
| 2010/0321128 A1* | 12/2010 | Merlin ............... G06K 7/10316 |
| | | 333/112 |
| 2013/0109304 A1* | 5/2013 | Marcu ................. G06K 7/0008 |
| | | 455/41.1 |
| 2014/0320264 A1* | 10/2014 | Schwarzmueller ......................... |
| | | G06K 7/10465 |
| | | 340/10.1 |
| 2016/0042678 A1 | 2/2016 | Liu et al. |
| 2018/0152823 A1 | 5/2018 | Kovacs et al. |
| 2021/0036740 A1* | 2/2021 | Steffan ................... H02J 50/10 |
| 2021/0201789 A1* | 7/2021 | Meng .................. G09G 3/3233 |
| 2022/0352927 A1* | 11/2022 | Pettersson ............... H04B 5/02 |

FOREIGN PATENT DOCUMENTS

| | | |
|---|---|---|
| CN | 102290871 A | 12/2011 |
| CN | 102930826 A | 2/2013 |
| CN | 103927576 A | 7/2014 |
| CN | 204102508 U | 1/2015 |
| CN | 105094230 A | 11/2015 |
| CN | 105321477 A | 2/2016 |
| CN | 108139877 A | 6/2018 |
| CN | 111210753 A | 5/2020 |
| EP | 3329357 A1 | 6/2018 |
| TW | 201308310 A | 2/2013 |
| TW | 201428633 A | 7/2014 |
| WO | 2017017481 A1 | 2/2017 |

OTHER PUBLICATIONS

Waveshare Electronics, 4.2inch Passive NFC-Powered e-Paper, No Battery, https://www.waveshare.com/4.2inch-nfc-powered-e-paper.htm, Dec. 12, 2019. (Year: 2019).*

Office action from Chinese Application No. 202010076282.9 dated May 19, 2021.

International Search Report from PCT/CN2021/071447 dated Apr. 1, 2021.

Written Opinion from PCT/CN2021/071447 dated Apr. 1, 2021.

* cited by examiner

DISPLAY APPARATUS, DISPLAY DRIVE CIRCUIT AND DRIVING METHOD OF ELECTRONIC PAPER DISPLAY UNIT

CROSS REFERENCE

The present disclosure is the national stage entry of PCT/CN2021/071447, filed Jan. 13, 2021 which claims the priority to the Chinese Patent Application No. 202010076282.9, entitled "DISPLAY DRIVE CIRCUIT, DISPLAY DRIVE METHOD AND DISPLAY APPARATUS", filed on Jan. 23, 2020, the entire contents of which are hereby incorporated by reference as a part of the present application.

TECHNICAL FIELD

The present disclosure relates to the field of display technology, and in particular to a display drive circuit of an electronic paper display unit, a display drive method of an electronic paper display unit, and a display apparatus.

BACKGROUND

Electronic paper display apparatuses have been widely used in electronic devices such as electronic price tags. At present, electronic devices such as electronic price tags usually use batteries as a power source for power supply, to make the electronic device work. However, the power of the battery is limited. After the power is exhausted, the battery needs to be replaced or recharged, which causes inconvenience, and the discarded battery can also cause environmental pollution.

It should be noted that the information disclosed in the BACKGROUND is only used to enhance the understanding of the background of the present disclosure, and therefore may include information that does not constitute the prior art known to those of ordinary skill in the art.

SUMMARY

The purpose of the present disclosure is to overcome the above-mentioned shortcomings of the prior art, and provide a display drive circuit of an electronic paper display unit, a display drive method of an electronic paper display unit, and a display apparatus.

According to an aspect of the present disclosure, there is provided a display drive circuit of an electronic paper display unit, including a display control circuit, wherein the display control circuit includes:

a capacitor unit;

a radio frequency circuit, connected to the capacitor unit and including an induction circuit and a communication circuit, wherein the induction circuit is configured to charge the capacitor unit in response to a radio frequency signal of a terminal device;

a voltage collection circuit, connected to the capacitor unit, and configured to collect a voltage of the capacitor unit; and a control circuit, connected to the radio frequency circuit, the capacitor unit and the voltage collection circuit, and configured to perform a transmission action when the voltage of the capacitor unit reaches an operating threshold voltage of the electronic paper display unit; turn off the voltage collection circuit and the communication circuit after the transmission action is completed; perform a refresh action when the voltage of the capacitor unit reaches a refresh threshold voltage of the electronic paper display unit; and control the electronic paper display unit to be powered off after the refresh action is completed, wherein the refresh threshold voltage is greater than the operating threshold voltage;

the transmission action includes: controlling the communication circuit to transmit image information sent by the terminal device to the electronic paper display unit; and the refresh action includes: controlling the electronic paper display unit to update a display content according to the image information.

In an exemplary embodiment of the present disclosure, the voltage collection circuit includes:

a voltage dividing circuit, connected to the capacitor unit, and configured to receive a voltage signal of the capacitor unit and output the collected voltage after voltage division;

an analog-to-digital converter, connected to the voltage dividing circuit, and configured to perform analog-to-digital conversion on the collected voltage to generate a conversion signal, wherein the control circuit is connected to the analog-to-digital converter and configured to determine a voltage of the capacitor according to the conversion signal.

In an exemplary embodiment of the present disclosure, the voltage dividing circuit includes:

a first voltage dividing resistor, wherein a first end of the first voltage dividing resistor is connected to the capacitor unit;

a second voltage dividing resistor, wherein a first end of the second voltage dividing resistor is connected to a second end of the first voltage dividing resistor and the analog-to-digital converter, and a second end of the second voltage dividing resistor is grounded.

In an exemplary embodiment of the present disclosure, the voltage collection circuit and the control circuit are integrated in an identical chip.

In an exemplary embodiment of the present disclosure, the communication circuit is connected to the capacitor unit through a first switch; the control circuit is configured to control the first switch to turn on or turn off the communication circuit.

In an exemplary embodiment of the present disclosure, the electronic paper unit is connected to the capacitor unit through a second switch; the control unit is configured to control the second switch to power on or power off the electronic paper display unit.

In an exemplary embodiment of the present disclosure, the second end of the first voltage dividing resistor is connected to the first end of the second voltage dividing resistor and the analog-to-digital converter through a third switch; the control unit is configured to control the third switch to turn on or turn off the voltage dividing circuit.

In an exemplary embodiment of the present disclosure, the electronic paper display unit includes an electronic paper display screen and a memory connected to each other;

the transmission action includes: controlling the communication circuit to transmit the image information sent by the terminal device to the memory through the control circuit;

the refresh action includes: controlling the electronic paper display screen to acquire the image information from the memory and display it.

In an exemplary embodiment of the present disclosure, the induction circuit includes:

an induction coil, configured to receive the radio frequency signal of the terminal device;

an induction component, connected to the induction coil and configured to charge the capacitor unit in response to the radio frequency signal.

In an exemplary embodiment of the present disclosure, the capacitor unit, the induction component, the communication circuit, the voltage collection circuit and the control circuit are all arranged outside a ring-shaped area surrounded by the induction coil.

In an exemplary embodiment of the present disclosure, the induction circuit and the communication circuit are integrated in an identical NFC (Near Field Communication) chip.

In an exemplary embodiment of the present disclosure, the capacitor unit includes a super capacitor, a first electrode of the super capacitor is connected to the radio frequency circuit and the control circuit, and a second electrode of the super capacitor is grounded.

According to an aspect of the present disclosure, there is provided a display apparatus, including an electronic paper display unit and the display drive circuit according to any one of the above.

According to an aspect of the present disclosure, there is provided a display drive method of an electronic paper display unit, applied to the display drive circuit according to any one of the above, and including:

charging the capacitor unit in response to a radio frequency signal of a terminal device through the induction circuit;

collecting a voltage of the capacitor unit by using the voltage collection circuit;

controlling the communication circuit to transmit image information sent by the terminal device to the electronic paper display unit, in response to that the voltage of the capacitor unit reaches an operating threshold voltage of the electronic paper display unit;

turning off the voltage collection circuit and the communication circuit;

controlling the electronic paper display unit to update a display content according to the image information, in response to that the voltage of the capacitor unit reaches a refresh threshold voltage of the electronic paper display unit, wherein the refresh threshold voltage is greater than the operating threshold voltage; and controlling the electronic paper display unit to be powered off.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments in accordance with the disclosure, and used to explain the principle of the disclosure together with the specification. The drawings in the following description are only some embodiments of the present disclosure. For those of ordinary skill in the art, other drawings can be obtained based on these drawings without creative work.

DETAILED DESCRIPTION

Figure 1:
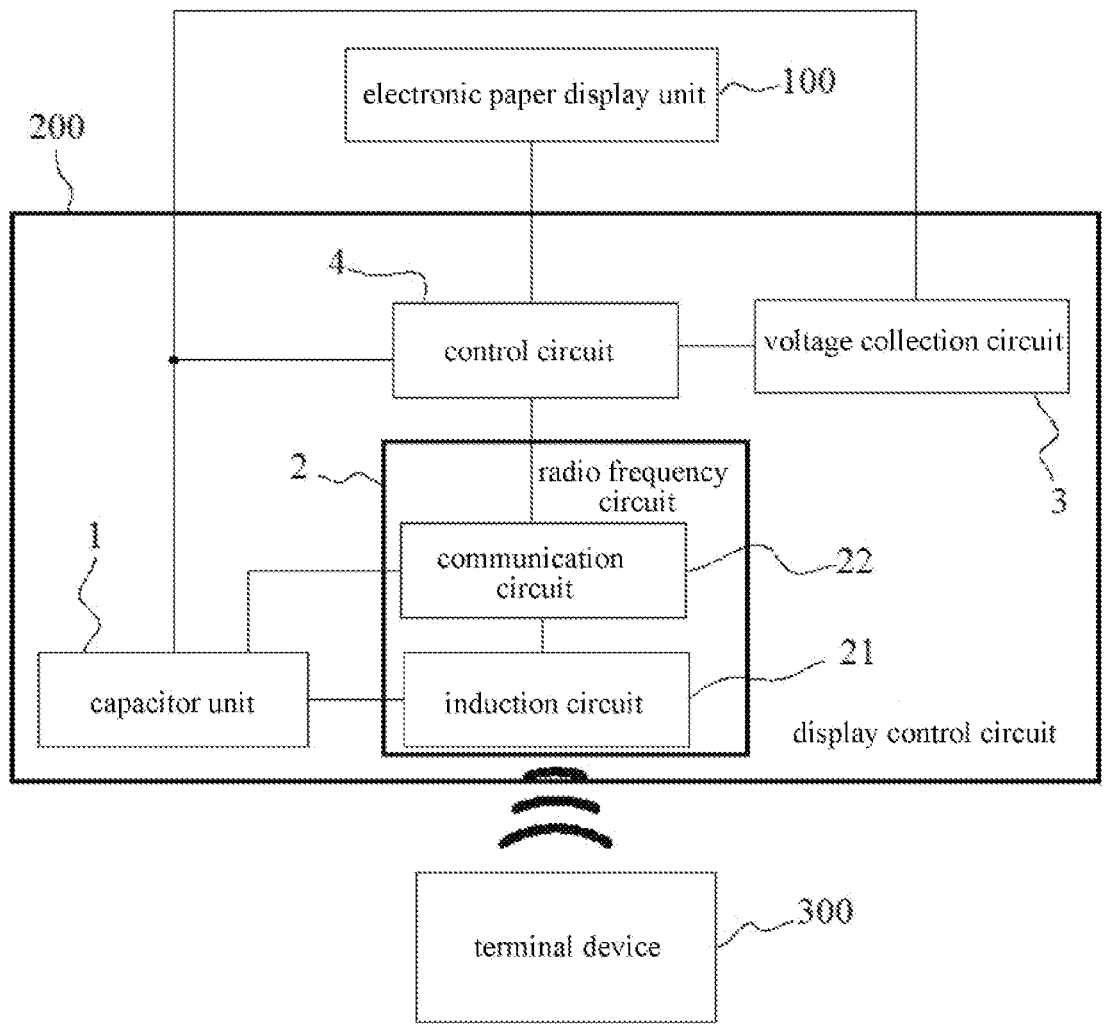
FIG. 1 is a circuit schematic diagram of an embodiment of the display drive circuit of the present disclosure.

Example embodiments will now be described more fully with reference to the accompanying drawings. However, the example embodiments can be implemented in various forms, and should not be construed as being limited to the embodiments set forth herein; on the contrary, these embodiments are provided so that the present disclosure will be comprehensive and complete, and fully convey the concept of the example embodiments to those skilled in the art. The same reference numerals in the figures indicate the same or similar structures, and thus their detailed descriptions will be omitted. In addition, the drawings are only schematic illustrations of the present disclosure, and are not necessarily drawn to scale.

The terms "a", "an", "the" and "said" are used to indicate the presence of one or more elements/components/etc.; the terms "including" and "having" are used to indicate open-ended inclusion and means that there may be other elements/components/etc. in addition to the listed elements/components/etc.; the terms "first", "second" and "third" are only used as marks, not to limit the number of the object.

As shown in FIG. 1, an embodiment of the present disclosure provides a display drive circuit of an electronic paper display unit 100. The display drive circuit may include a display control circuit 200. The display control circuit 200 is used to drive the electronic paper display unit 100 to display images. The display control circuit 200 includes a capacitor unit 1, a radio frequency circuit 2, a voltage collection circuit 3 and a control circuit 4.

In the embodiment, the radio frequency circuit 2 is connected to the capacitor unit 1 and including an induction circuit 21 and a communication circuit 22. The induction circuit 21 is configured to charge the capacitor unit 1 in response to a radio frequency signal of a terminal device 300. The voltage collection circuit 3 is connected to the capacitor unit 1, and configured to collect a voltage of the capacitor unit 1.

The control circuit 4 is connected to the electronic paper display unit 100, the capacitor unit 1 and the voltage collection circuit 3, and configured to perform a transmission action when the voltage of the capacitor unit 1 reaches an operating threshold voltage of the electronic paper display unit 100; turn off the voltage collection circuit 3 and the communication circuit 22 after the transmission action is completed; perform a refresh action when the voltage of the capacitor unit 1 reaches a refresh threshold voltage of the electronic paper display unit 100; and control the electronic paper display unit 100 to be powered off after the refresh action is completed. In the embodiment, the refresh threshold voltage is greater than the operating threshold voltage;

the transmission action includes: controlling the communication circuit 22 to transmit image information sent by the terminal device 300 to the electronic paper display unit 100; and the refresh action includes: controlling the electronic paper display unit 100 to update a display content according to the image information.

The display drive circuit of the embodiment of the present disclosure can charge the capacitor unit 1 through the electrical signal generated by the radio frequency circuit 2 inducing the radio frequency signal of the terminal device 300, so that the capacitor unit 1 can be used as a power source to provide electrical energy for the entire display drive circuit, and the radio frequency circuit 2 can also transmit (directly or indirectly) the image information from the terminal device 300 to the electronic paper display unit 100, so that the electronic paper display unit 100 displays images, so as to realize data transmission and image display without being powered by the battery. At the same time, after the image information is transmitted, the voltage collection circuit 3 and the communication circuit 22 are turned off, and after the electronic paper display unit 100 displays the image, the electronic paper display unit 100 is powered off, so that the power loss is minimized on the premise that the display effect is not affected, which is beneficial to shortening the charging time of the capacitor unit 1 and improving the response speed.

Hereinafter, each part of the display drive circuit of the embodiment of the present disclosure will be described in detail.

As shown in FIG. 1, the capacitor unit 1 can be used to store electrical energy to provide electrical energy for the display drive circuit. For example, the capacitor unit 1 may include a super capacitor in order to obtain a high number of times of charge and discharge and prolong the service life. A first electrode of the super capacitor is connected to the radio frequency circuit 2, the control circuit 4 and the electronic paper display unit 100, and a second electrode of the super capacitor can be grounded, so that it can receive the current of the radio frequency circuit 2 and can also provide electrical energy to the control circuit 4 and the electronic paper display unit 100.

As shown in FIG. 1, the radio frequency circuit 2 includes an induction circuit 21 and a communication circuit 22.

In the embodiment, the induction circuit 21 is connected to the capacitor unit 1, and the induction circuit 21 can generate an electrical signal in response to a radio frequency signal sent by a terminal device 300, and output a current to the capacitor unit 1, thereby charging the capacitor unit 1, so that it can charge the capacitor unit 1 according to the radio frequency induction manner through the radio frequency circuit 2. For example, the manner for the induction circuit 21 and the terminal device 300 to achieve radio frequency induction can be NFC (Near Field Communication) communication or other manners, as long as the current used to charge the capacitor unit 1 can be formed.

The terminal device 300 may be a mobile phone, a tablet computer, or other devices capable of performing radio frequency induction with the radio frequency circuit 2, which is not specifically limited herein.

Figure 3:
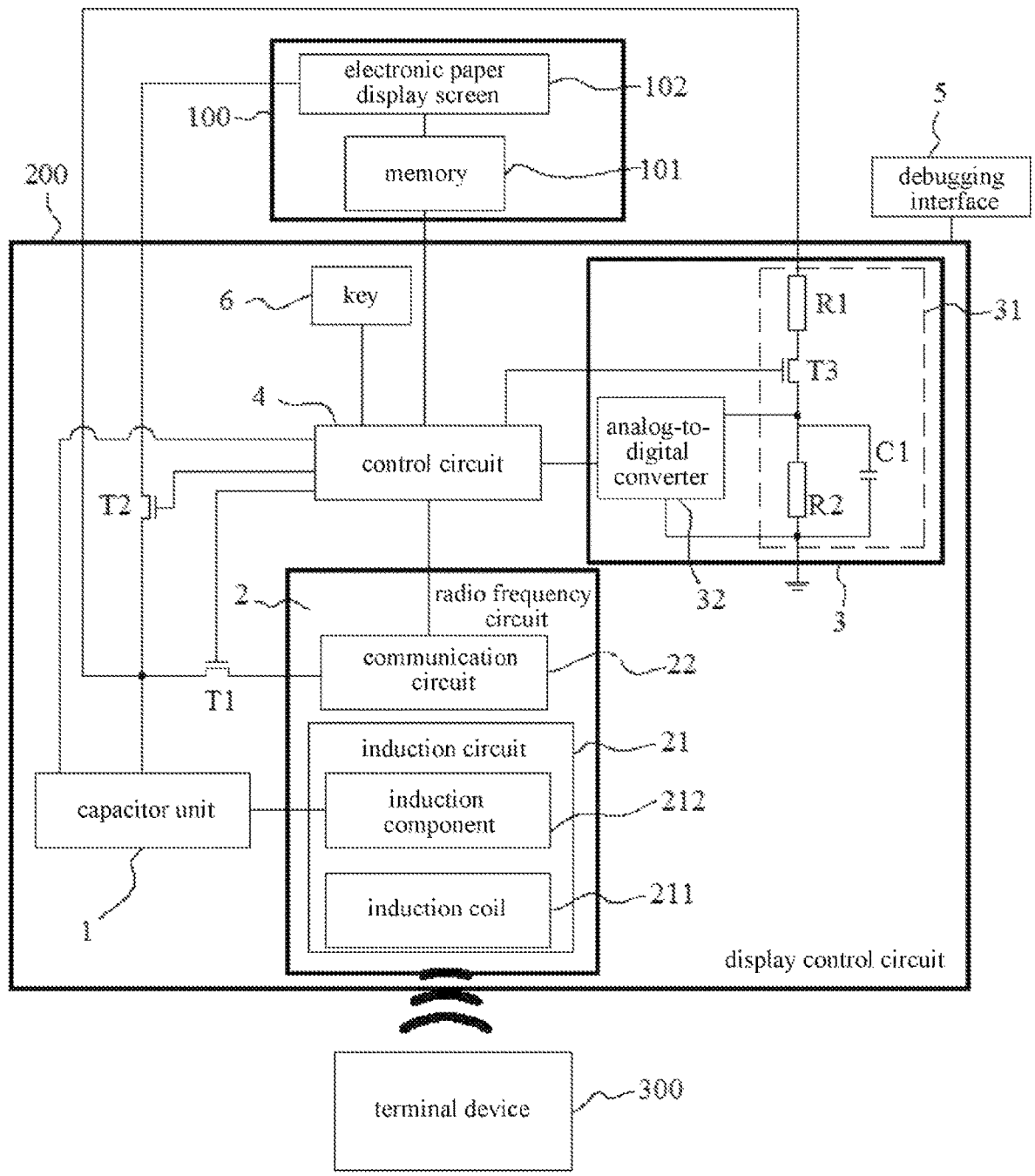
FIG. 3 is a schematic diagram of still another embodiment of the display drive circuit of the present disclosure.

In some embodiments of the present disclosure, as shown in FIG. 3, the induction circuit 21 includes an induction coil 211 and an induction component 212.

In the embodiment, the induction coil 211 has a ring structure, such as a rectangle, a circle, or a waist circle, which is not particularly limited herein. The induction coil 211 can receive the radio frequency signal sent by the terminal device 300.

Figure 4:
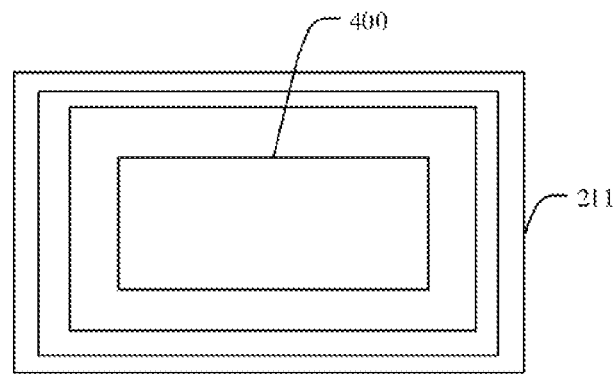
FIG. 4 is a schematic diagram of a circuit layout of an embodiment of the display drive circuit of the present disclosure.
Figure 5:
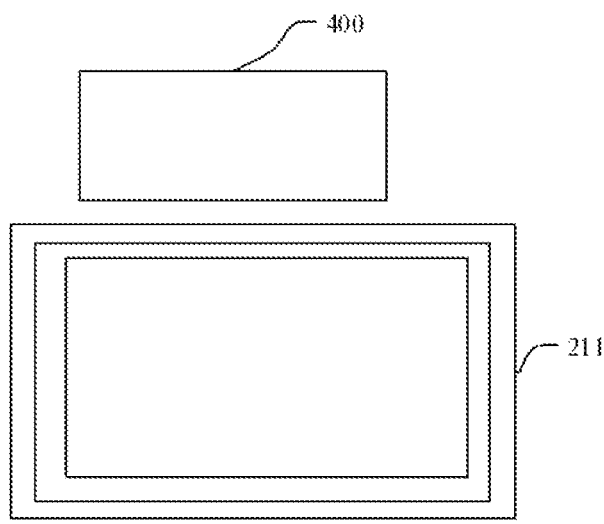
FIG. 5 is a schematic diagram of a circuit layout of another embodiment of the display drive circuit of the present disclosure.

As shown in FIG. 4, as for a small-sized electronic paper display unit 100, such as a 2.66-inch (diagonal length) rectangular electronic paper display unit, due to the limitation of internal space, the capacitor unit 1, the induction component 212, the communication circuit 22, the voltage collection circuit 3 and the control circuit 4 can be arranged within the ring-shaped area surrounded by the induction coil 211. As shown in FIG. 5, as for a large-sized electronic paper display unit 100, such as a 4.2-inch electronic paper display unit, the capacitor unit 1, the induction component 212, the communication circuit 22, the voltage collection circuit 3 and the control circuit 4 can be arranged outside a ring-shaped area surrounded by the induction coil 211, so as to reduce the number of magnetic lines of force penetrated when the radio-frequency signals are coupled, resulting in a reduction in the induced electromotive force of the induction coil 211. The mark 400 in FIG. 4 and FIG. 5 schematically shows an entire circuit composed of the capacitor unit 1, the induction component 212, the communication circuit 22, the voltage collection circuit 3 and the control circuit 4, which does not constitute a limitation on the specific circuit.

The induction component 212 is connected to the induction coil 211 and is used to convert the radio frequency signal into a certain voltage and current signal for output, so as to charge the capacitor unit 1.

The communication circuit 22 can receive the radio frequency signal sent by the terminal device 300, obtain image information by modulating and demodulating the radio frequency signal, and can communicate with the electronic paper display unit 100 according to the communication protocol (such as NFC communication protocol, etc.), thereby transmitting the image information to the electronic paper display unit 100, to drive the electronic paper display unit 100 to display corresponding images. Exemplarily, the control circuit 4 may transmit image information with the communication circuit 22 through the I2C (Inter-Integrated Circuit) bus.

It should be noted that the communication circuit 22 may transmit image information to the electronic paper display unit 100 in the following manners: the communication circuit 22 directly communicates with the electronic paper display unit 100; or, the communication circuit 22 can also indirectly communicate with the electronic paper display unit 100 through the control circuit 4, as long as the image information can be transmitted to the electronic paper display unit 100.

In some embodiments of the present disclosure, the induction circuit 21 and the communication circuit 22 are integrated in the same NFC chip, such as the ST25DV chip, etc., which is not specifically limited herein.

As shown in FIG. 1, the voltage collection circuit 3 can be connected to the capacitor unit 1 to collect the voltage of the capacitor unit 1, so that the control circuit 4 can judge the voltage of the capacitor unit 1.

Figure 2:
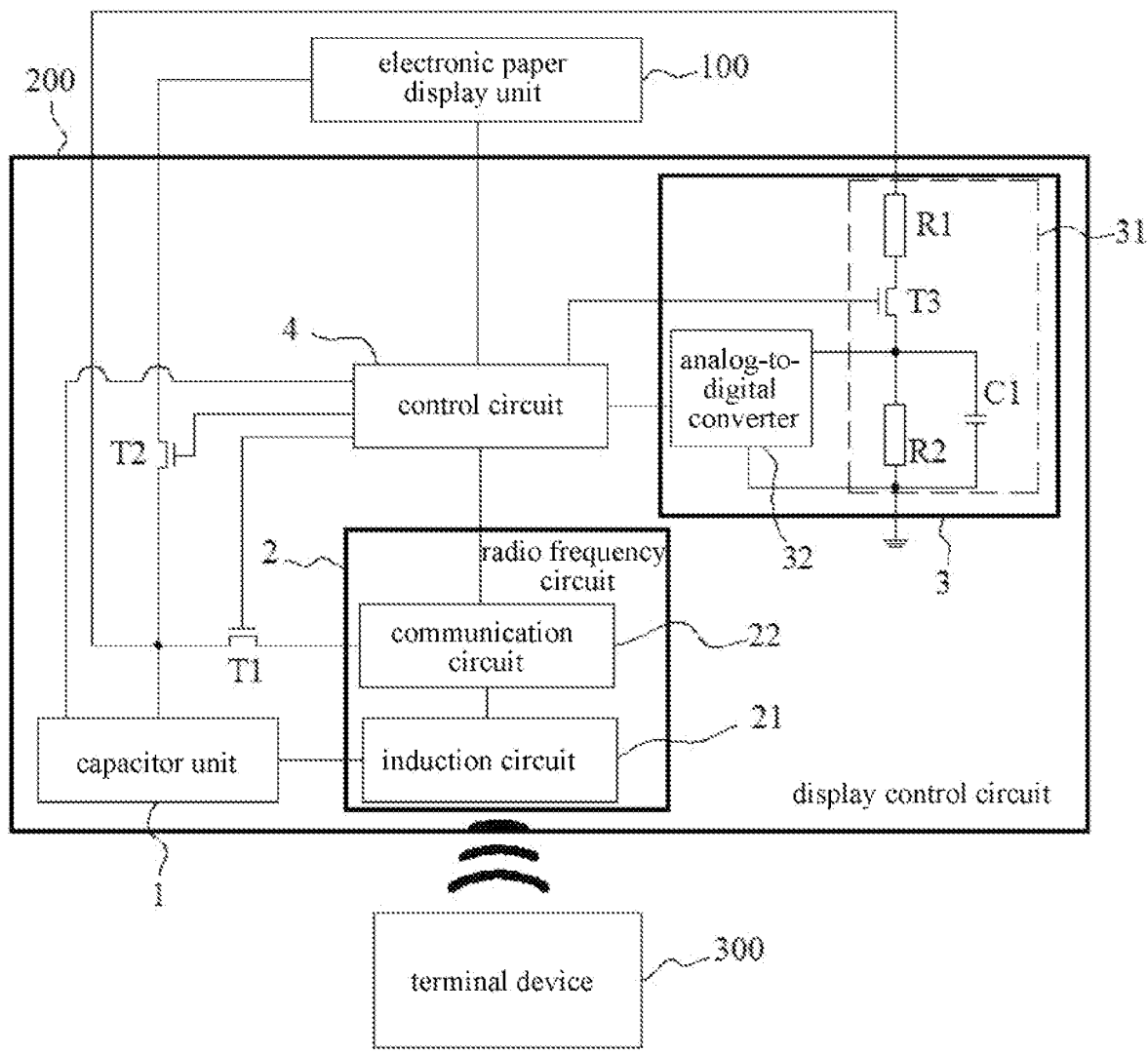
FIG. 2 is a circuit schematic diagram of another embodiment of the display drive circuit of the present disclosure.

In some embodiments of the present disclosure, as shown in FIG. 2, the voltage collection circuit 3 includes a voltage dividing circuit 31 and an analog-to-digital converter 32.

In the embodiment, the voltage dividing circuit 31 is connected to the capacitor unit 1 and used for receiving the voltage signal of the capacitor unit 1 and outputting the collected voltage after the voltage division, to prevent the voltage output to the control circuit 4 from exceeding the upper limit of the normal operation voltage of the control circuit 4. The voltage dividing circuit 31 may be a resistive voltage dividing circuit or a capacitive voltage dividing circuit, and its structure is not specifically limited herein.

The analog-to-digital converter 32 can be connected to the voltage dividing circuit 31, and can perform analog-to-digital conversion on the collected voltage to generate a conversion signal, that is, converting the analog signal of the collected voltage into a digital signal. The specific structure and principle of the analog-to-digital converter 32 are not specifically limited herein, as long as the function of analog-to-digital conversion can be realized. Exemplarily, the analog-to-digital converter 32 may be connected to the voltage dividing circuit 31 through a GPIO (General Purpose Input Output) port, to obtain the collected voltage.

As shown in FIG. 1, the control circuit 4 can be connected to the capacitor unit 1 and the voltage collection circuit 3 at the same time. The capacitor unit 1 can provide electrical energy for the control circuit 4. When the voltage of the capacitor unit 1 reaches the operating threshold voltage of the control circuit 4, the control circuit 4 is activated.

After the control circuit 4 is activated, the electrical signal collected by the voltage collection circuit 3 can be received to determine the voltage of the capacitor unit 1, and the voltage of the capacitor unit 1 is compared with the operating threshold voltage of the electronic paper display unit 100. When the voltage of the capacitor unit 1 reaches the operating threshold voltage of the electronic paper display unit 100, the control circuit 4 may perform a transmission action. The transmission action includes: controlling the communication circuit 22 to transmit image information sent by the terminal device 300 to the electronic paper display unit 100. That is, the control circuit 4 controls to turn on the communication circuit 22, and transmits the image information from the terminal device 300 to the electronic paper display unit 100 through the communication circuit 22. The above-mentioned operating threshold voltage of the electronic paper display unit 100 is the voltage for writing data to the electronic paper display unit 100, that is, the voltage for writing the image information, and its specific value depends on the electronic paper display unit 100.

After the above-mentioned transmission action is completed, the control circuit 4 can turn off the voltage collection circuit 3 and the communication circuit 22, to reduce the power consumption of the capacitor unit 1.

When the voltage of the capacitor unit 1 reaches the refresh threshold voltage of the electronic paper display unit 100, the control circuit 4 can perform a refresh action. The refresh action includes: controlling the electronic paper display unit 100 to update a display content according to the image information, that is, displaying the image corresponding to the current image information. For example, the image can be product information (introduction, price, etc.) or user information (name, title, etc.). It can also be other images, which will not be listed herein.

The refresh threshold voltage is a voltage at which the electronic paper display unit 100 refreshes data according to image information to drive the electronic paper display unit 100 to display images. The refresh threshold voltage is greater than the operating threshold voltage of the electronic paper display unit 100 described above.

After the above refresh action is completed, the control circuit 4 can control the electronic paper display unit 100 to be powered off, in order to reduce the power consumption of the capacitor unit 1. At the same time, based on the electrophoretic display principle, the electronic paper display unit 100 can still display the original image before the image information is refreshed again.

In some embodiments of the present disclosure, as shown in FIG. 3, the electronic paper display unit 100 includes a memory 101 and an electronic paper display screen 102.

In the embodiment, the memory 101 is connected to the control circuit 4, so that when the communication circuit 22 is turned on, the image information received from the terminal device 300 by the communication circuit 22 is received through the control circuit 4 and stored in the memory 101. In other words, the transmission action may include: controlling the communication circuit 22 to transmit the image information sent by the terminal device 300 to the memory 101 through the control circuit 4. For example, after the communication circuit 22 receives the image information from the terminal device 300, it can send an interrupt signal to the control circuit 4 for notifying the control circuit 4, and the control circuit 4 can receive the image information via the I2C bus in response to the interrupt signal, and then transmit to the memory 101.

The electronic paper display screen 102 is connected to the memory 101 to obtain and display the image information stored in the memory 101. In other words, the refresh action includes: controlling the electronic paper display screen 102 to acquire the image information from the memory 101 and display it.

As shown in FIG. 2, the following examplarliy describes that the control circuit 4 determines the voltage of the capacitor unit 1 according to the electrical signal collected by the voltage collection circuit 3.

In some embodiments of the present disclosure, the voltage collection circuit 3 includes a voltage dividing circuit 31 and an analog-to-digital converter 32.

In the embodiment, the voltage dividing circuit 31 includes a first voltage dividing resistor R1 and a second voltage dividing resistor R2.

In the embodiment, the first end of the first voltage dividing resistor R1 is connected to the capacitor unit 1. The first end of the second voltage dividing resistor R2 is connected to the second end of the first voltage dividing resistor R1 and the analog-to-digital converter 32, and the second end of the second voltage dividing resistor R2 is grounded.

The analog-to-digital converter 32 can detect the voltage between the two ends of the second voltage dividing resistor R2, i.e., the above-mentioned collected voltage. Further, the voltage dividing circuit 31 may further include a filter capacitor C1, and the filter capacitor may be connected in parallel with the second voltage divider resistor R1 to filter the collected voltage.

The analog-to-digital converter 32 can be connected to the voltage dividing circuit 31, and can perform analog-to-digital conversion on the collected voltage to generate a conversion signal, that is, converting the analog signal of the collected voltage into a digital signal. The specific structure and principle of the analog-to-digital converter 32 are not specifically limited herein, as long as the function of analog-to-digital conversion can be realized. Exemplarily, the analog-to-digital converter 32 may be connected to the voltage dividing circuit 31 through a GPIO (General Purpose Input Output) port, to obtain the collected voltage.

The control circuit 4 may be connected to the analog-to-digital converter 32, to generate the voltage of the capacitor unit 1 according to the conversion signal. The collected voltage output by the voltage dividing circuit 31 is the divided voltage, which is smaller than the actual voltage of the capacitor unit 1. Therefore, the control circuit 4 needs to determine the actual voltage of the capacitor unit 1 according to the conversion signal. For example, when the voltage dividing circuit 31 is determined, the corresponding relationship between the collected voltage and the actual voltage of the capacitor unit 1 can be determined. The control circuit 4 can pre-store the corresponding relationship, and calculate the voltage of the capacitor unit 1 according to the conversion signal and the corresponding relationship, to serve as the actual voltage.

The control circuit 4 and the analog-to-digital converter 32 can be integrated in the same chip, or the entire voltage collection circuit 3 can also be integrated in the same chip with the control circuit 4. The chip can be a single-chip microcomputer (MCU), or other chips or integrated circuits having similar data processing and control functions, but not limited to this. The control circuit 4 and the voltage collection circuit 3 can also be independent devices or circuits, instead of being integrated in the same chip or integrated circuit.

As shown in FIG. 2, in order to control the communication circuit 22 by the control circuit 4, in some embodiments of the present disclosure, the capacitor unit 1 can be connected to the communication circuit 22 through the first switch T1, and the control circuit 4 can control the turn-on/turn-off of the communication circuit 22 by controlling the on/off of the first switch T1. Specifically, when the first switch T1 is turned on, the communication circuit 22 is turned on to transmit image information; when the first switch T1 is turned off, the communication circuit 22 is turned off, at this time, in the radio frequency circuit 2, the induction circuit 21 works normally, that is, charges the capacitor unit 1.

For example, the first switch T1 is a transistor, which has a control terminal (gate), a first terminal (source), and a second terminal (drain). The first terminal is connected to the capacitor unit 1, the second terminal is connected to the communication circuit 22, and the control terminal is connected to the control circuit 4, so that a control signal can be applied to the control terminal through the control circuit 4, to control the on and off of the first terminal and the second terminal, thereby realizing the control of the communication circuit 22. The first terminal and the second terminal can also be exchanged.

As shown in FIG. 2, in order to realize the control of the electronic paper display unit 100 by the control circuit 4, in some embodiments of the present disclosure, the electronic paper display unit 100 may be connected to the capacitor unit 1 through the second switch T2, and the control circuit 4 may control the power-on or power-off of the electronic paper display unit 100 by controlling the on/off of the second switch T2, thereby controlling the power-on or power-off of the electronic paper display unit 100. Specifically, when the second switch T2 is turned on, the electronic paper display unit 100 is powered on, images can be displayed; when the second switch T2 is turned off, the electronic paper display unit 100 is powered off, and the electronic paper display unit 100 maintains the original state when being powered on, without refreshing data.

For example, the second switch T2 is a transistor, which has a control terminal (gate), a first terminal (source), and a second terminal (drain). The first terminal is connected to the capacitor unit 1, the second terminal is connected to the electronic paper display unit 100, the control terminal is connected to the control circuit 4, so that a control signal can be applied to the control terminal through the control circuit 4, to control the on and off of the first terminal and the second terminal, thereby realizing the control of the electronic paper display unit 100. The first terminal and the second terminal can also be exchanged.

As shown in FIG. 2, in order to realize the control of the voltage collection circuit 3 by the control circuit 4, in some embodiments of the present disclosure, the second end of the first voltage dividing resistor R1 can be connected to the first terminal R1 of the second voltage dividing resistor and the analog-to-digital converter 32 through the third switch T3; the control circuit 4 can turn on or off the voltage dividing circuit 31 by controlling the on/off of the second switch T2, thereby realizing the turn-on or turn-off of the voltage collection circuit 3.

For example, the third switch T3 is a transistor having a control terminal (gate), a first terminal (source), and a second terminal (drain). The first terminal is connected to the second terminal of the first voltage dividing resistor R1, the second terminal is connected to the first terminal R1 of the second voltage dividing resistor R2 and the analog-to-digital converter 32, and the control terminal is connected to the control circuit 4, so that the control signal can be applied to the control terminal through the control circuit 4, to control the turn-on and turn-off of the first terminal and the second terminal, so as to realize the control of the voltage dividing circuit 31. The first terminal and the second terminal can also be exchanged.

The types of the transistors of the first switch T1, the second switch T2 and the third switch T3 are not particularly limited herein. For example, a metal-oxide semiconductor field effect transistor (MOSFET) can be used; or, it can also be replaced with circuits having the same function.

In addition, as shown in FIG. 3, the display control circuit 200 may also have a debugging interface 5. The debugging interface 5 may be connected to the control circuit 4 for debugging the display control circuit 200. Furthermore, as shown in FIG. 3, the display control circuit 200 may further include a key 6 which can be connected to the control circuit 4 for resetting the control circuit 4.

The following takes a 2.66-inch rectangular electronic paper display unit and a super capacitor serving as the capacitor unit 1 as an example, to illustrate the selection of the super capacitor.

The formula for the charging and discharging time of a super capacitor is: $C \times \Delta V = I \times t$; where C is the rated capacity of the super capacitor; $\Delta V$ is the step-up/step-down difference; I is the charging and discharging current, and t is the charging and discharging time.

Estimation of operating parameters:

The charging voltage of the super capacitor: it not only needs to meet the operating threshold voltage of all devices, but also needs to meet the requirements of the electronic paper display unit 100 to display images. Due to the compact size of the 2.66-inch electronic paper display unit, super capacitors and other devices are all placed within the induction coil 211. The super capacitors are required to be as small and thin as possible. However, it is difficult for such super capacitors to meet the requirements of the peak current of the circuit. Therefore, the charging voltage needs to be improved to support the completion of the entire operating process of the electronic paper display unit. Through experimental verification, the charging voltage can be 2.5V.

Discharging current: the main power consumption objects of the super capacitor include the control circuit 4, the radio frequency circuit 2 and the electronic paper display unit 100. The discharging current can be determined according to the operating current of the control circuit 4, the radio frequency circuit 2 and the electronic paper display unit 100. The peak value of the charging current is about 13 mA.

Discharging time: considering that the charging/discharging current of the super capacitor is flat during the transmission of image information by the communication circuit 22, the discharging time is mainly the refresh time of the driving unit 102, and the refresh time is 16 seconds.

According to the above charging and discharging formula, C=13 mA×16 s/2.5V=0.083 F, the capacity of the super capacitor should not be less than 0.083 F, and the actual usage capacity can be 0.22 F.

According to the above charging and discharging formula, the charging time of the super capacitor can be calculated. It is assumed that the average current for charging the super capacitor by the radio frequency circuit 2 is 8.5 mA, and the super capacitor starts to be charged at a voltage of 1.8V, since all the devices of the electronic paper display unit 100 below 1.8V are in the power-off state, together with the self-discharge of the super capacitor, the total current consumption is less, which is only a few microamps (for example, less than 10 µA), thus, the voltage of the super capacitor can be kept close to 1.8V for a long time. Therefore, the charging time of the super capacitor (voltage from 1.8V to 2.5V) is t=0.22 F×0.7V/8.5 mA≈18 seconds.

The above is only an exemplary description of a 2.66-inch rectangular electronic paper display unit, and those skilled in the art can determine relevant parameters of the super capacitor in electronic paper display units of other sizes according to this manner, which will not be described in detail herein.

The embodiments of the present disclosure provide a display drive method of an electronic paper display unit, which is applied to the display drive circuit of any of the above embodiments. The structure of the electronic paper display unit and the display drive circuit can refer to the above display drive circuit embodiments, which will not be repeated herein. The display drive method includes:

step S110, charging the capacitor unit in response to a radio frequency signal of a terminal device through the induction circuit;

step S120, collecting a voltage of the capacitor unit by using the voltage collection circuit;

step S130, controlling the communication circuit to transmit image information sent by the terminal device to the electronic paper display unit, in response to that the voltage of the capacitor unit reaches an operating threshold voltage of the electronic paper display unit;

step S140, turning off the voltage collection circuit and the communication circuit;

step S150, controlling the electronic paper display unit to update a display content according to the image information, in response to that the voltage of the capacitor unit reaches a refresh threshold voltage of the electronic paper display unit, wherein the refresh threshold voltage is greater than the operating threshold voltage; and step S160, controlling the electronic paper display unit to be powered off.

The specific details of the steps of the display drive method in the embodiments of the present disclosure have been described in detail in the above embodiments of the display drive circuit, which may refer to the embodiments of the display drive circuit, where step S130 is the transmission action, and step S150 is the refresh action. At the same time, the beneficial effects of the display drive method can also refer to the beneficial effects of the above-mentioned display drive circuit, which will not be repeated herein.

The embodiments of the present disclosure provide a display apparatus. As shown in FIG. 1, the display apparatus may include an electronic paper display unit and the display drive circuit of any of the above-mentioned embodiments. Its beneficial effects may refer to the above-mentioned embodiment of the display drive circuit, which will not be repeated herein. The display apparatus can be used for display devices such as electronic price tags and e-book readers or the like.

The embodiments of the present disclosure also provide a display system, as shown in FIGS. 1 to 3, the display system may include a terminal device 300 and the display apparatus of any of the foregoing embodiments. The terminal device 300 may be a mobile phone, a tablet computer or the like having a radio frequency sensing function, and the structure of the display apparatus can refer to the above-mentioned implementation of the display drive circuit and the display apparatus, which will not be repeated herein.

Those skilled in the art will easily think of other embodiments of the present disclosure after considering the specification and practicing the invention disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed in the present disclosure. The description and embodiments are only regarded as exemplary, and the true scope and spirit of the present disclosure are indicated by the appended claims.

What is claimed is:

1. A display drive circuit of an electronic paper display unit, comprising a display control circuit, wherein the display control circuit comprises:
   a capacitor unit;
   a radio frequency circuit, connected to the capacitor unit and comprising an induction circuit and a communication circuit, wherein the induction circuit is configured to charge the capacitor unit in response to a radio frequency signal of a terminal device;
   a voltage collection circuit, connected to the capacitor unit, and configured to collect a voltage of the capacitor unit; and
   a control circuit, connected to the radio frequency circuit, the capacitor unit and the voltage collection circuit, and configured to perform a transmission action when the voltage of the capacitor unit reaches an operating threshold voltage of the electronic paper display unit; turn off the voltage collection circuit and the communication circuit after the transmission action is completed; perform a refresh action when the voltage of the capacitor unit reaches a refresh threshold voltage of the electronic paper display unit; and control the electronic paper display unit to be powered off after the refresh action is completed,
   wherein the refresh threshold voltage is greater than the operating threshold voltage;
   the transmission action comprises: controlling the communication circuit to transmit image information sent by the terminal device to the electronic paper display unit; and
   the refresh action comprises: controlling the electronic paper display unit to update a display content according to the image information.

2. The display drive circuit according to claim 1, wherein the voltage collection circuit comprises:
   a voltage dividing circuit, connected to the capacitor unit, and configured to receive a voltage signal of the capacitor unit and output the collected voltage after voltage division;
   an analog-to-digital converter, connected to the voltage dividing circuit, and configured to perform analog-to-digital conversion on the collected voltage to generate a conversion signal,
   wherein the control circuit is connected to the analog-to-digital converter and configured to determine a voltage of the capacitor according to the conversion signal.

3. The display drive circuit according to claim 2, wherein the voltage dividing circuit comprises:
   a first voltage dividing resistor, wherein a first end of the first voltage dividing resistor is connected to the capacitor unit;

a second voltage dividing resistor, wherein a first end of the second voltage dividing resistor is connected to a second end of the first voltage dividing resistor and the analog-to-digital converter, and a second end of the second voltage dividing resistor is grounded.

4. The display drive circuit according to claim 1, wherein the voltage collection circuit and the control circuit are integrated in an identical chip.

5. The display drive circuit according to claim 1, wherein the communication circuit is connected to the capacitor unit through a first switch; the control circuit is configured to control the first switch to turn on or turn off the communication circuit.

6. The display drive circuit according to claim 1, wherein the electronic paper display unit is connected to the capacitor unit through a second switch; the control unit is configured to control the second switch to power on or power off the electronic paper display unit.

7. The display drive circuit according to claim 3, wherein the second end of the first voltage dividing resistor is connected to the first end of the second voltage dividing resistor and the analog-to-digital converter through a third switch; the control unit is configured to control the third switch to turn on or turn off the voltage dividing circuit.

8. The display drive circuit according to claim 1, wherein the electronic paper display unit comprises an electronic paper display screen and a memory connected to each other;
the transmission action comprises: controlling the communication circuit to transmit the image information sent by the terminal device to the memory through the control circuit;
the refresh action comprises: controlling the electronic paper display screen to acquire the image information from the memory and display it.

9. The display drive circuit according to claim 1, wherein the induction circuit comprises:
an induction coil, configured to receive the radio frequency signal of the terminal device;
an induction component, connected to the induction coil and configured to charge the capacitor unit in response to the radio frequency signal.

10. The display drive circuit according to claim 9, wherein the capacitor unit, the induction component, the communication circuit, the voltage collection circuit and the control circuit are all arranged outside a ring-shaped area surrounded by the induction coil.

11. The display drive circuit according to claim 1, wherein the induction circuit and the communication circuit are integrated in an identical NFC (Near Field Communication) chip.

12. The display drive circuit according to claim 1, wherein the capacitor unit comprises a super capacitor, a first electrode of the super capacitor is connected to the radio frequency circuit and the control circuit, and a second electrode of the super capacitor is grounded.

13. A display apparatus, comprising an electronic paper display unit and a display drive circuit of an electronic paper display unit, wherein the display drive circuit comprises a display control circuit and the display control circuit comprises:
a capacitor unit;
a radio frequency circuit, connected to the capacitor unit and comprising an induction circuit and a communication circuit, wherein the induction circuit is configured to charge the capacitor unit in response to a radio frequency signal of a terminal device;
a voltage collection circuit, connected to the capacitor unit, and configured to collect a voltage of the capacitor unit; and
a control circuit, connected to the radio frequency circuit, the capacitor unit and the voltage collection circuit, and configured to perform a transmission action when the voltage of the capacitor unit reaches an operating threshold voltage of the electronic paper display unit; turn off the voltage collection circuit and the communication circuit after the transmission action is completed; perform a refresh action when the voltage of the capacitor unit reaches a refresh threshold voltage of the electronic paper display unit and control the electronic paper display unit to be powered off after the refresh action is completed,
wherein the refresh threshold voltage is greater than the operating threshold voltage;
the transmission action comprises: controlling the communication circuit to transmit image information sent by the terminal device to the electronic paper display unit; and
the refresh action comprises: controlling the electronic paper display unit to update a display content according to the image information.

14. A display drive method of an electronic paper display unit, applied to a display drive circuit of an electronic paper display unit, wherein the display drive circuit comprises a display control circuit and the display control circuit comprises: a capacitor unit; a radio frequency circuit, connected to the capacitor unit and comprising an induction circuit and a communication circuit, wherein the induction circuit is configured to charge the capacitor unit in response to a radio frequency signal of a terminal device; a voltage collection circuit, connected to the capacitor unit, and configured to collect a voltage of the capacitor unit and a control circuit, connected to the radio frequency circuit, the capacitor unit and the voltage collection circuit, and configured to perform a transmission action when the voltage of the capacitor unit reaches an operating threshold voltage of the electronic paper display unit turn off the voltage collection circuit and the communication circuit after the transmission action is completed;
perform a refresh action when the voltage of the capacitor unit reaches a refresh threshold voltage of the electronic paper display unit and control the electronic paper display unit to be powered off after the refresh action is completed, wherein the refresh threshold voltage is greater than the operating threshold voltage; the transmission action comprises: controlling the communication circuit to transmit image information sent by the terminal device to the electronic paper display unit and the refresh action comprises: controlling the electronic paper display unit to update a display content according to the image information, and the display drive method comprises:
charging the capacitor unit in response to a radio frequency signal of a terminal device through the induction circuit;
collecting a voltage of the capacitor unit by using the voltage collection circuit;
controlling the communication circuit to transmit image information sent by the terminal device to the electronic paper display unit, in response to that the voltage of the capacitor unit reaches an operating threshold voltage of the electronic paper display unit;
turning off the voltage collection circuit and the communication circuit;

controlling the electronic paper display unit to update a display content according to the image information, in response to that the voltage of the capacitor unit reaches a refresh threshold voltage of the electronic paper display unit, wherein the refresh threshold voltage is greater than the operating threshold voltage; and controlling the electronic paper display unit to be powered off.

15. The display apparatus according to claim 13, wherein the voltage collection circuit comprises:
   a voltage dividing circuit, connected to the capacitor unit, and configured to receive a voltage signal of the capacitor unit and output the collected voltage after voltage division;
   an analog-to-digital converter, connected to the voltage dividing circuit, and configured to perform analog-to-digital conversion on the collected voltage to generate a conversion signal, wherein the control circuit is connected to the analog-to-digital converter and configured to determine a voltage of the capacitor according to the conversion signal.

16. The display apparatus according to claim 15, wherein the voltage dividing circuit comprises:
   a first voltage dividing resistor, wherein a first end of the first voltage dividing resistor is connected to the capacitor unit;
   a second voltage dividing resistor, wherein a first end of the second voltage dividing resistor is connected to a second end of the first voltage dividing resistor and the analog-to- digital converter, and a second end of the second voltage dividing resistor is grounded.

17. The display apparatus according to claim 13, wherein the voltage collection circuit and the control circuit are integrated in an identical chip.

18. The display apparatus according to claim 13, wherein the communication circuit is connected to the capacitor unit through a first switch; the control circuit is configured to control the first switch to turn on or turn off the communication circuit.

19. The display apparatus according to claim 13, wherein the electronic paper display unit is connected to the capacitor unit through a second switch; the control unit is configured to control the second switch to power on or power off the electronic paper display unit.

20. The display apparatus according to claim 16, wherein the second end of the first voltage dividing resistor is connected to the first end of the second voltage dividing resistor and the analog-to-digital converter through a third switch; the control unit is configured to control the third switch to turn on or turn off the voltage dividing circuit.

\* \* \* \* \*